US012339617B2

(12) United States Patent
Saeki

(10) Patent No.: US 12,339,617 B2
(45) Date of Patent: Jun. 24, 2025

(54) DRUM CARTRIDGE IN WHICH FIRST STORAGE MEDIUM OF TONER CARTRIDGE AND SECOND STORAGE MEDIUM OF DRUM CARTRIDGE ARE ALIGNED IN MOUNTING DIRECTION, AND IMAGE FORMING APPARATUS TO WHICH DRUM CARTRIDGE IS MOUNTABLE

(71) Applicant: BROTHER KOGYO KABUSHIKI KAISHA, Nagoya (JP)

(72) Inventor: Masahito Saeki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/463,582

(22) Filed: Sep. 8, 2023

(65) Prior Publication Data

US 2023/0418220 A1 Dec. 28, 2023

Related U.S. Application Data

(63) Continuation of application No. 17/570,827, filed on Jan. 7, 2022, now Pat. No. 11,789,405, which is a (Continued)

(30) Foreign Application Priority Data

Mar. 12, 2018 (JP) ................................ 2018-044200

(51) Int. Cl.
*G03G 21/00* (2006.01)
*G03G 21/18* (2006.01)

(52) U.S. Cl.
CPC ................................ *G03G 21/1867* (2013.01)

(58) Field of Classification Search
USPC ........................................................ 399/111
See application file for complete search history.

(56) References Cited

U.S. PATENT DOCUMENTS 5,937,239 A 8/1999 Watanabe et al.
5,946,531 A 8/1999 Miura et al.
(Continued)

FOREIGN PATENT DOCUMENTS

CN 103395296 A 11/2013
CN 103092047 B 5/2015
(Continued)

OTHER PUBLICATIONS

Office Action issued in corresponding Chinese Patent Application No. 201910179565.3, Apr. 27, 2021.
(Continued)

*Primary Examiner* — Quana Grainger
(74) *Attorney, Agent, or Firm* — Merchant & Gould P.C.

(57) ABSTRACT

A drum cartridge mountable to an image forming apparatus in a mounting direction, the drum cartridge including: a frame having an opening, the frame allowing a toner cartridge to be attached, and the frame including a housing configured to accommodate therein a toner and a first storage medium including a first electric contact; a photosensitive drum; and a second storage medium including a second electric contact and located at an outer surface of the frame, and in a state where the toner cartridge is mounted to the frame, the first storage medium is exposed via the opening and the second storage medium is aligned with the first storage medium in the mounting direction of the drum cartridge.

18 Claims, 10 Drawing Sheets

Related U.S. Application Data continuation of application No. 16/891,951, filed on Jun. 3, 2020, now Pat. No. 11,221,585, which is a continuation of application No. 16/297,048, filed on Mar. 8, 2019, now Pat. No. 10,712,711.

(56) References Cited

U.S. PATENT DOCUMENTS

| | | | | |
|---|---|---|---|---|
| 2004/0047648 | A1 | 3/2004 | Saito et al. | |
| 2007/0146826 | A1 | 6/2007 | Inao et al. | |
| 2008/0124133 | A1 | 5/2008 | Yoshizawa | |
| 2008/0240774 | A1* | 10/2008 | Fukamachi ........ | G03G 15/0865 399/111 |
| 2008/0240776 | A1* | 10/2008 | Ishikawa ............ | G03G 21/1832 399/114 |
| 2009/0067872 | A1 | 3/2009 | Kim | |
| 2009/0269086 | A1 | 10/2009 | Mikuni | |
| 2012/0039622 | A1 | 2/2012 | Cho | |
| 2013/0039668 | A1 | 2/2013 | Takahashi | |
| 2013/0114971 | A1 | 5/2013 | Sasaki et al. | |
| 2017/0277119 | A1 | 9/2017 | Sakai et al. | |
| 2018/0095420 | A1* | 4/2018 | Abe ................... | G03G 21/1867 |
| 2018/0210393 | A1 | 7/2018 | Makiguchi et al. | |
| 2018/0314185 | A1 | 11/2018 | Yin et al. | |
| 2019/0196361 | A1 | 7/2019 | Kyotani | |

FOREIGN PATENT DOCUMENTS

| | | | |
|---|---|---|---|
| CN | 205750283 | U | 11/2016 |
| CN | 206479775 | U | 9/2017 |
| EP | 3385793 | A1 | 10/2018 |
| JP | 2003-255807 | A | 9/2003 |
| JP | 2012-061707 | A | 9/2003 |
| JP | 2007-171799 | A | 7/2007 |
| JP | 2009-8698 | A | 1/2009 |
| JP | 2009-265401 | A | 11/2009 |

OTHER PUBLICATIONS

Second Office Action issued in corresponding Chinese Patent Application No. 201910179565.3, Nov. 12, 2021.
Office Action issued in corresponding Japanese Patent Application No. 2018-044200, mailed Jan. 18, 2022.
Decision of Rejection issued in corresponding Chinese Patent Application No. 201910179565.3, issued Apr. 2, 2022.
Third Office Action issued in corresponding Chinese Patent Application No. 201910179565.3, issued Aug. 16, 2022.

* cited by examiner

DRUM CARTRIDGE IN WHICH FIRST STORAGE MEDIUM OF TONER CARTRIDGE AND SECOND STORAGE MEDIUM OF DRUM CARTRIDGE ARE ALIGNED IN MOUNTING DIRECTION, AND IMAGE FORMING APPARATUS TO WHICH DRUM CARTRIDGE IS MOUNTABLE

CROSS-REFERENCE TO RELATED APPLICATIONS

This application is a continuation of U.S. patent application Ser. No. 17/570,827, filed Jan. 7, 2022, now U.S. Pat. No. 11,789,405, which is a continuation of U.S. patent application Ser. No. 16/891,951, filed Jun. 3, 2020, now U.S. Pat. No. 11,221,585, which is a continuation of U.S. patent application Ser. No. 16/297,048, filed Mar. 8, 2019, now U.S. Pat. No. 10,712,711, which claims priority from Japanese Patent Application No. 2018-044200, filed on Mar. 12, 2018, the entire contents of which are incorporated herein by reference.

TECHNICAL FIELD

The present disclosure relates to a drum cartridge and an image forming apparatus to which the drum cartridge is mountable.

BACKGROUND

In related art, a process cartridge that is mountable to an image forming apparatus and has a storage medium such as an IC chip has been known. In the technology, the image forming apparatus can read out information of the process cartridge from the storage medium when the process cartridge is mounted to the image forming apparatus.

Also, a separation-type cartridge, which is different from an integration-type process cartridge is also known. For example, a toner cartridge that is mountable to a drum cartridge is known.

In the drum cartridge and the toner cartridge that are known, since the drum cartridge and the toner cartridge can be individually replaced in correspondence to each lifetime, it is required to read out information from each of the drum cartridge and the toner cartridge. However, if each of the drum cartridge and the toner cartridge is provided with the storage medium, it is necessary to arrange a member for reading out the information in the image forming apparatus, in correspondence to each storage medium. For this reason, the image forming apparatus becomes enlarged, depending on the arrangement of the storage mediums.

SUMMARY

An object of the present disclosure to suppress the image forming apparatus from being enlarged when each of the drum cartridge and the toner cartridge is provided with the storage medium.

According to an illustrative embodiment of the present disclosure, there is provided a drum cartridge mountable to an image forming apparatus in a mounting direction, the drum cartridge including: a frame having an opening, the frame allowing a toner cartridge to be attached, and the frame including a housing configured to accommodate therein a toner and a first storage medium including a first electric contact; a photosensitive drum; and a second storage medium including a second electric contact and located at an outer surface of the frame, and in a state where the toner cartridge is mounted to the frame, the first storage medium is exposed via the opening and the second storage medium is aligned with the first storage medium in the mounting direction of the drum cartridge.

DETAILED DESCRIPTION

Hereinafter, an illustrative embodiment of the present disclosure will be described in detail with reference to the drawings.

Figure 1:
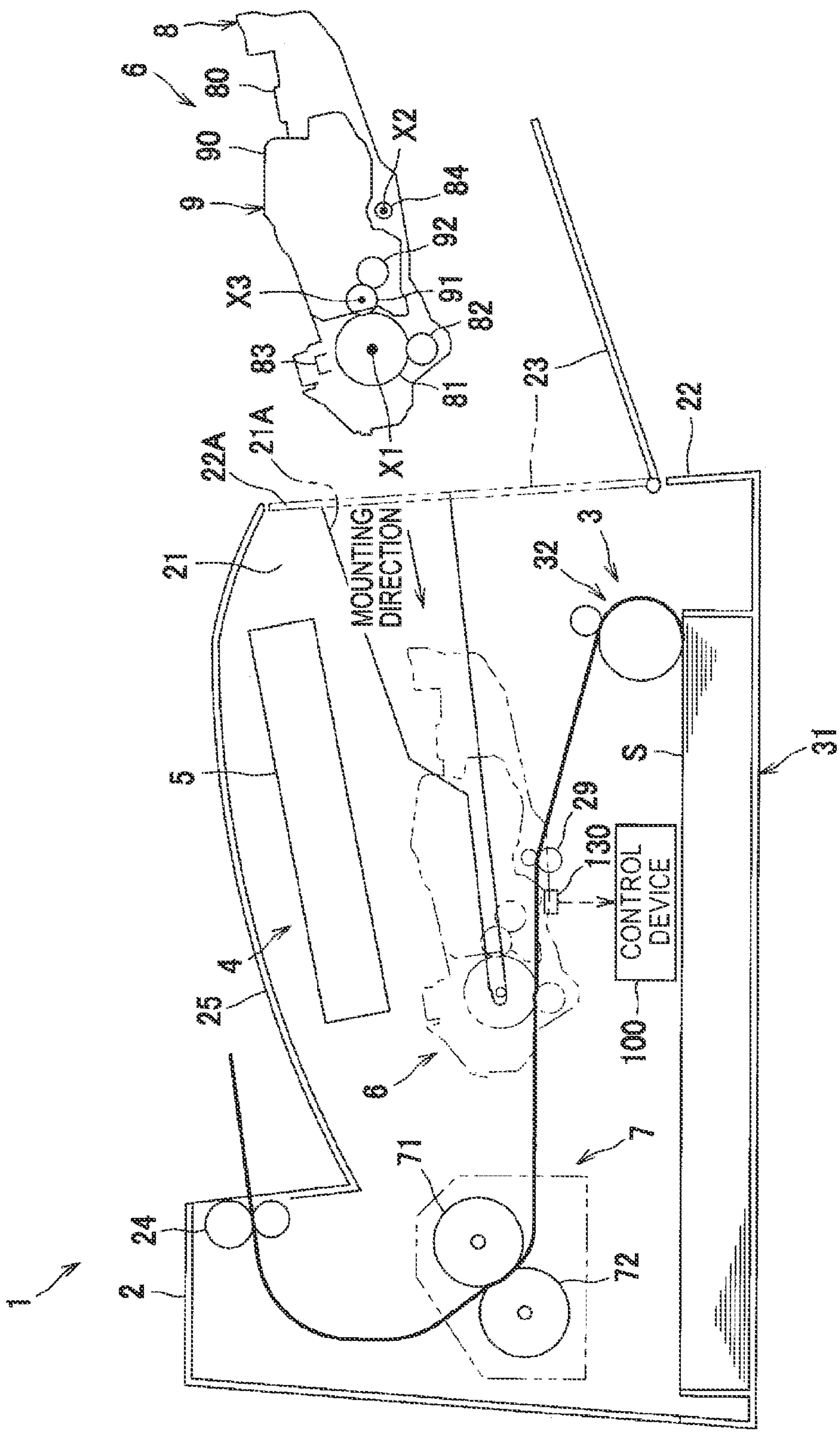
FIG. 1 depicts a schematic configuration of an image forming apparatus in accordance with an illustrative embodiment of the present disclosure.

As shown in FIG. 1, an image forming apparatus 1, which is a monochrome printer, mainly includes a main body housing 2, a feeder unit 3 for feeding a recording sheet S into the main body housing 2, an image forming unit 4 for forming an image on the recording sheet S, and a control device 100.

The main body housing 2 has a hollow case shape. The main body housing 2 includes sidewalls 21 and a front wall 22 connecting the sidewalls 21. The sidewalls 21 are formed with guide grooves 21A for guiding a process cartridge 6. The process cartridge 6 will be described later. The front wall 22 is formed with a main body opening 22A and is provided a swingable front cover 23 for opening and closing the main body opening 22A. The guide groove 21A extends from an inside of the main body housing 2 to the main body opening 22A.

The feeder unit 3 includes a feeder tray 31 detachably mounted to a lower part of the main body housing 2 and a feeder mechanism 32 configured to feed the recording sheet S in the feeder tray 31 toward the image forming unit 4.

The image forming unit 4 includes a scanner unit 5, a process cartridge 6, and a fixing device 7.

The scanner unit 5 is provided at an upper part in the main body housing 2 and includes a laser light-emitting unit, a polygon mirror, a lens, a reflector and the like, which are not shown. With the scanner unit 5, a laser beam is scanned at high speed on a surface of a photosensitive drum 81, which will be described later.

The control device 100 includes, for example, a CPU, a RAM, a ROM and an input/output circuit, and is configured to execute printing control by executing calculation processing based on information of the mounted cartridge, and a program and data stored in the ROM.

The process cartridge 6 is arranged between the feeder unit 3 and the scanner unit 5. The process cartridge 6 is mountable to the main body housing 2 in a mounting direction through the main body opening 22A that is to be opened and closed by the front cover 23 of the main body housing 2. The process cartridge 6 is mounted along the guide grooves 21A formed at the main body housing 2. That is, the mounting direction is a direction along the guide groove 21A.

The process cartridge 6 includes a drum cartridge 8 and a toner cartridge 9 that is mountable to the drum cartridge 8. The toner cartridge 9 is mounted to the image forming apparatus 1 as the process cartridge 6, in a state where the toner cartridge 9 is mounted to the drum cartridge 8.

The drum cartridge 8 mainly includes a frame 80 to which the toner cartridge 9 is mountable, a photosensitive drum 81, a transfer roller 82, a charger 83, and a pinch roller 84. The photosensitive drum 81 is rotatable about a first axis X1 extending in an axial direction. The axial direction is a first intersection direction intersecting with the mounting direction. In the illustrative embodiment, the axial direction is perpendicular to the mounting direction.

Figure 2:
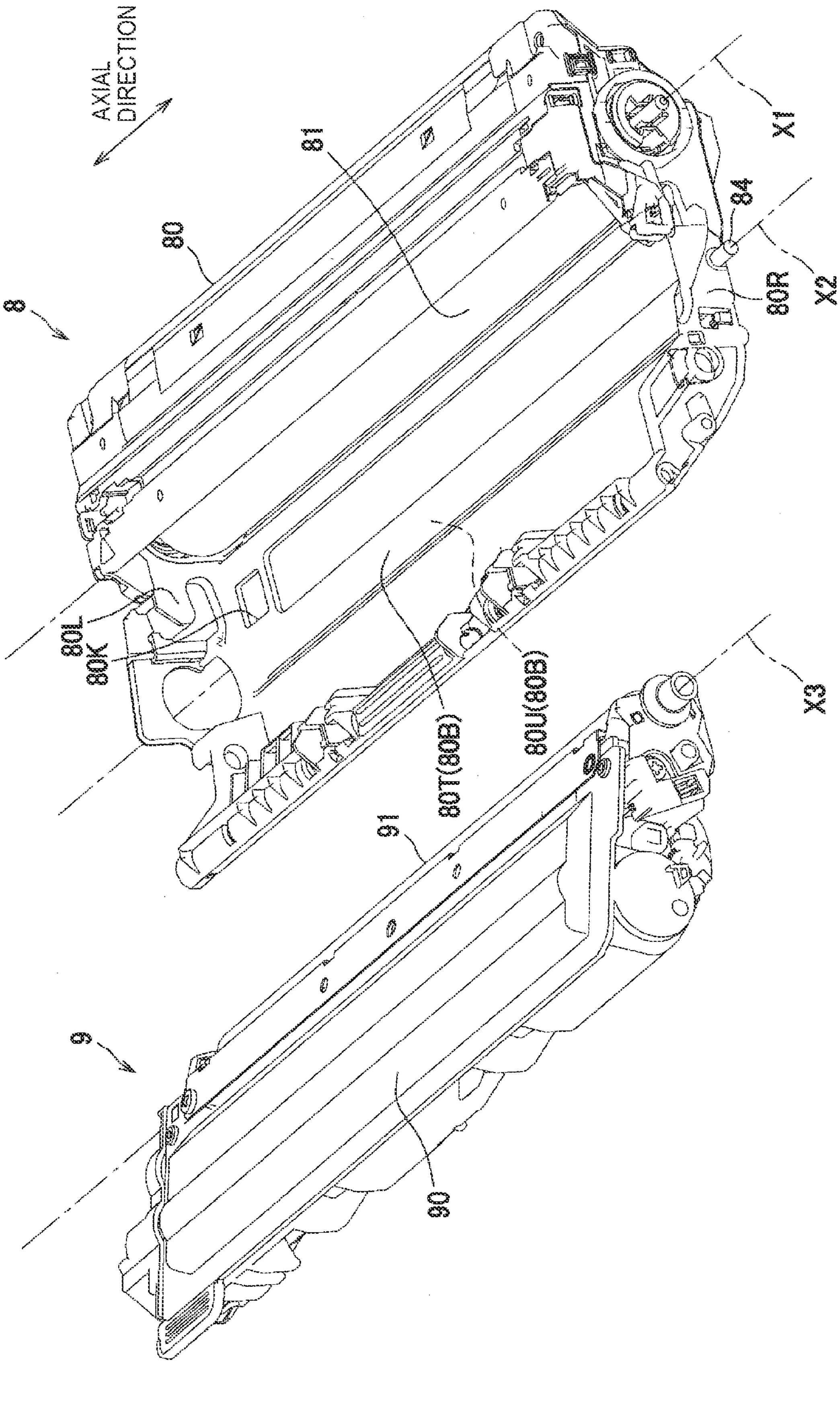
FIG. 2 is a perspective view of a drum cartridge and a toner cartridge.

As shown in FIG. 2, the frame 80 includes a first side frame 80L, a second side frame 80R, a bottom frame 80B. The frame 80 has an opening 80K. The first side frame 80L is located at one end portion of the frame 80 in the axial direction. The second side frame 80R is located at the other end portion of the frame 80 in the axial direction. The first side frame 80L and the second side frame 80R intersect with the axial direction. The toner cartridge 9 is mountable between the first side frame 80L and the second side frame 80R.

The bottom frame 80B connects the first side frame 80L and the second side frame 80R. The bottom frame 80B has a first surface 80T, a second surface 80U and the opening 80K. In a state where the toner cartridge 9 is mounted to the frame 80, the first surface 80T faces the toner cartridge 9. The second surface 80U is an opposite surface to the first surface 80T. The opening has a rectangular shape. The opening 80K is located at one end-side of the bottom frame in the axial direction.

The pinch roller 84 is located at an opposite side to the toner cartridge 9 with the bottom frame 80B being interposed therebetween. The pinch roller 84 is rotatable about a second axis X2 extending in the axial direction. The pinch roller 84 is arranged to face a registration roller 29 arranged in the main body housing 2 as shown in FIG. 1. The pinch roller 84 is configured to guide the recording sheet S together with the registration roller 29.

As shown in FIG. 1, the toner cartridge 9 mainly includes a housing 90 configured to accommodate therein toner, a developing roller 91 and a supply roller 92. The developing roller 91 is rotatable about a third axis X3 extending in the axial direction. The developing roller 91 is configured to supply the toner to the photosensitive drum 81. The supply roller 92 is configured to supply the toner in the housing 90 to the developing roller 91.

In the process cartridge 6, a surface of the rotating photosensitive drum 81 is uniformly charged by the charger 83, and is then exposed by the high-speed scanning of the laser beam emitted from the scanner unit 5. Thereby, a potential of the exposed part is lowered, so that an electrostatic latent image based on image data is formed on the surface of the photosensitive drum 81.

Then, the toner in the toner cartridge 9 is supplied to the electrostatic latent image on the photosensitive drum 81 by the developing roller 91 that is rotatively driven, so that a toner image is formed on the surface of the photosensitive drum 81. Thereafter, the recording sheet S is conveyed between the photosensitive drum 81 and the transfer roller 82, so that the toner image carried on the surface of the photosensitive drum 81 is transferred to the recording sheet S.

The fixing device 7 includes a heating roller 71 and a pressing roller 72 arranged to face the heating roller 71 and configured to press the heating roller 71. In the fixing device 7 configured in this way, the toner transferred to the recording sheet S is heat-fixed while the recording sheet S passes between the heating roller 71 and the pressing roller 72.

In the meantime, the recording sheet S heat-fixed by the fixing device 7 is conveyed to sheet discharge rollers 24 arranged downstream of the fixing device 7 and is then delivered from the sheet discharge rollers 24 onto a sheet discharge tray 25.

Figure 3:
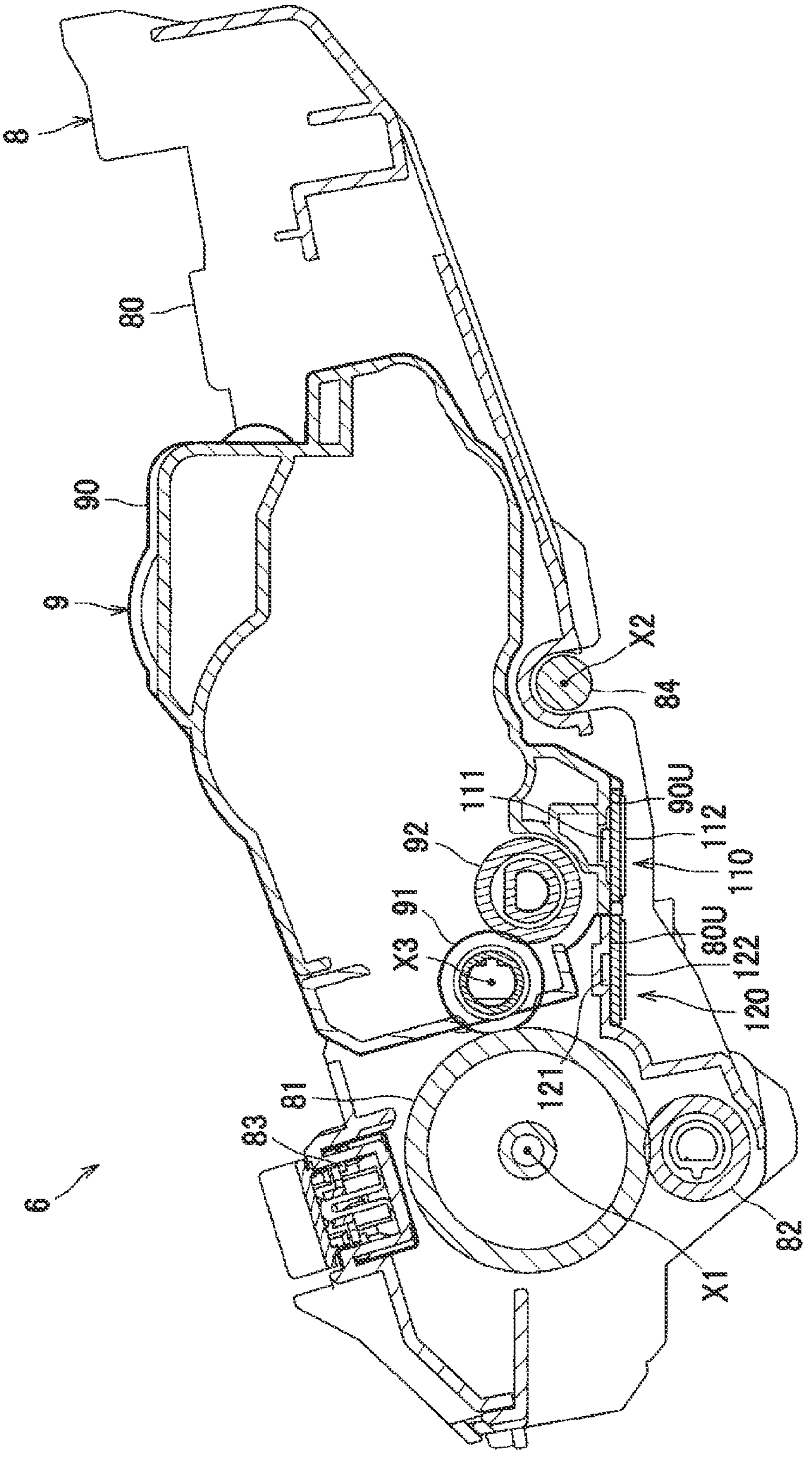
FIG. 3 is a sectional view of a process cartridge.

As shown in FIG. 3, the drum cartridge 8 includes a second storage medium 120. The second storage medium is a medium for storing therein information, such as an IC chip but is not limited to the IC chip. The second storage medium 120 is located at an outer surface of the frame 80. Specifically, the second storage medium 120 is located at the second surface 80U. The second storage medium 120 is fixed to the drum cartridge 8 by adhesion.

The second storage medium 120 includes a storage element 121 and second electric contact 122. Product information of the drum cartridge 8 is stored in the storage element 121. The second electric contact 122 is connected to the storage element 121.

Figure 4:
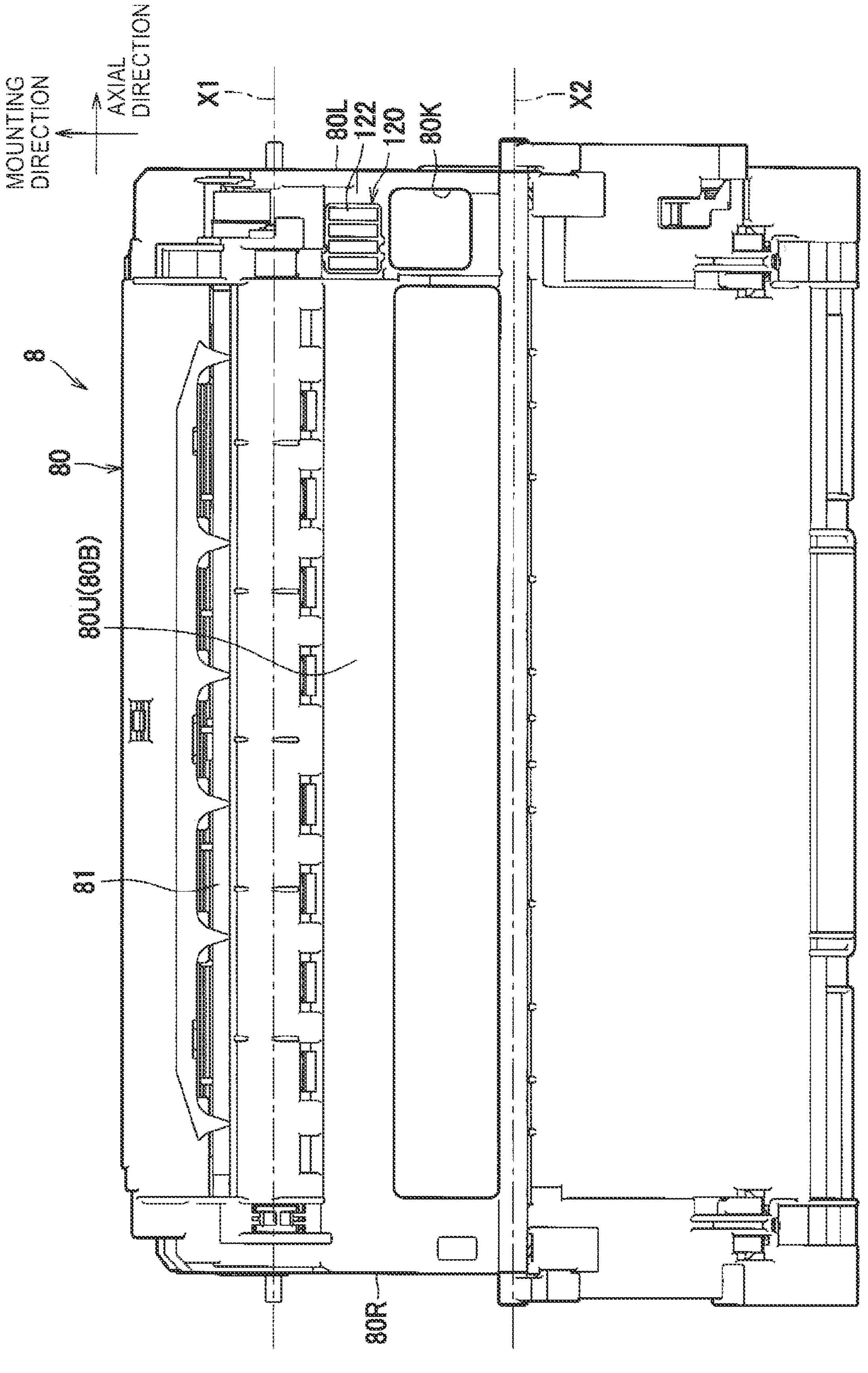
FIG. 4 depicts the drum cartridge, as seen from below.

As shown in FIG. 4, the second storage medium 120 is located at one end-side of the bottom frame 80B in the axial direction. The second storage medium 120 aligns with the opening 80K in the mounting direction.

The second electric contact 122 is formed of a metal layer arranged on a surface of a substrate. A surface of the second electric contact 122 has a planar shape. The second electric contact 122 includes a plurality of second electric contacts 122. Each of the plurality of second electric contacts 122 has a rectangular shape extending in the mounting direction. The plurality of second electric contacts 122 is aligned in the axial direction with slight intervals.

As shown in FIG. 3, the toner cartridge 9 includes a first storage medium 110. The first storage medium is a medium for storing therein information, such as an IC chip but is not limited to the IC chip. The first storage medium 110 is located at a bottom surface 90U of a side at which the housing 90 faces the bottom frame 80B when the toner cartridge 9 is mounted to the drum cartridge 8. The first storage medium 110 is fixed to the toner cartridge 9 by adhesion.

Figure 5:
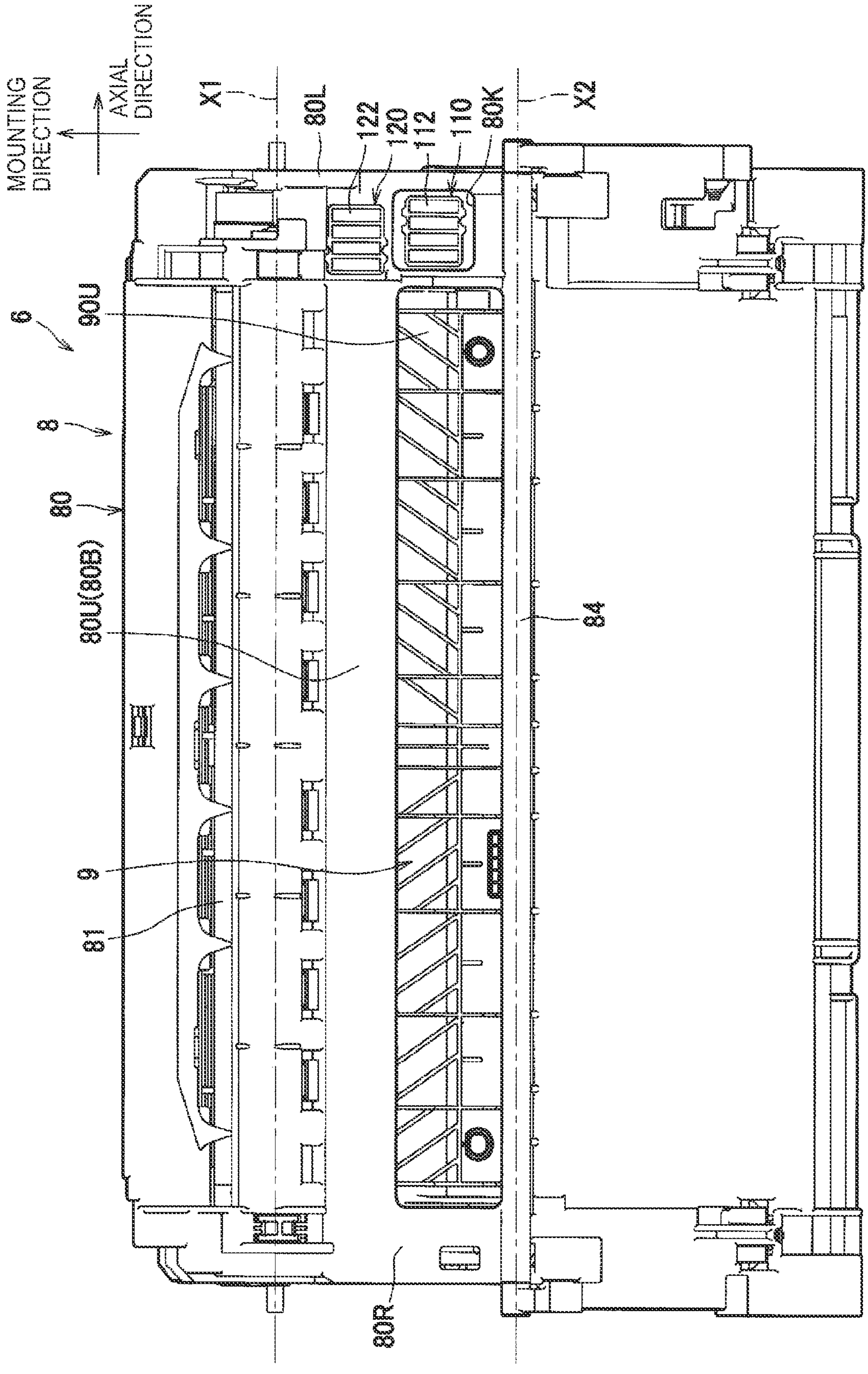
FIG. 5 depicts the process cartridge, as seen from below.

The first storage medium 110 includes a storage element 111 and first electric contact 112. In the storage element 111 of the first storage medium 110, product information of the toner cartridge 9 is stored. The first electric contact 112 is connected to the storage element 111. As shown in FIG. 5, the first storage medium 110 is located at one end-side of the housing 90 in the axial direction. In the state where the toner cartridge 9 is mounted to the drum cartridge 8, the first storage medium 110 is exposed via the opening 80K, and the second storage medium 120 is aligned with the first storage medium 110 in the mounting direction.

The first electric contact 112 is formed of a metal layer arranged on a surface of a substrate. A surface of the first electric contact 112 has a planar shape. The first electric contact 112 includes a plurality of first electric contacts 112. Each of the plurality of first electric contacts 112 has a rectangular shape extending in the mounting direction. The plurality of first electric contacts 112 is aligned in the axial direction with slight intervals.

Figure 6:
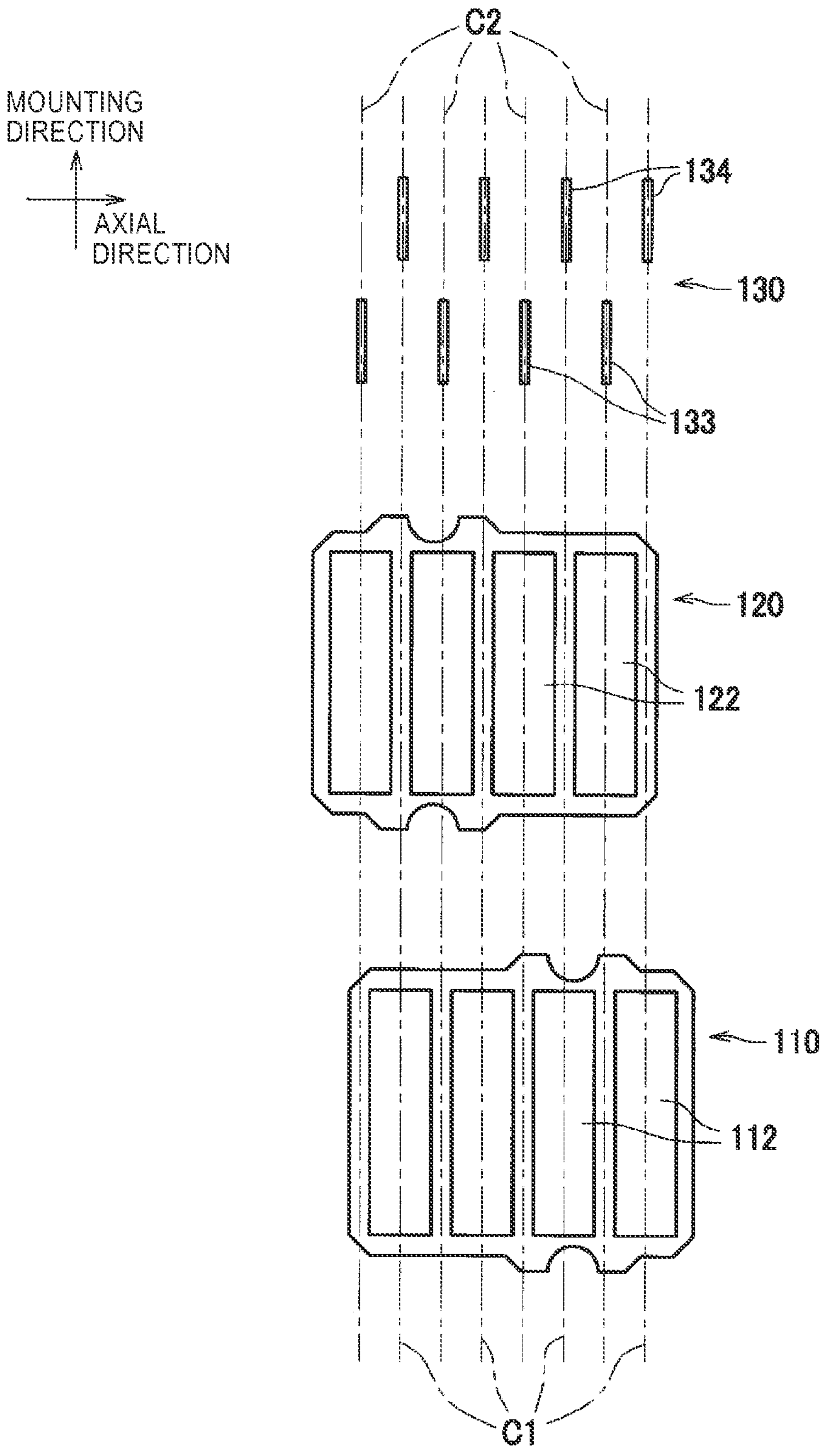
FIG. 6 depicts a positional relation among a first storage medium, a second storage medium, a third electric contact and a fourth electric contact.

As shown in FIG. 6, a center position C2 of each of the plurality of second electric contacts 122 in the axial direction is different from a center position C1 of each of the plurality of first electric contacts 112 in the axial direction. Specifically, respective center positions C1 of the plurality of first electric contacts 112 and respective center positions C2 of the plurality of second electric contacts 122 are alternately aligned in the axial direction.

As shown in FIG. 3, the second electric contacts 122 and the first electric contacts 112 are located at a same plane.

Figure 7:
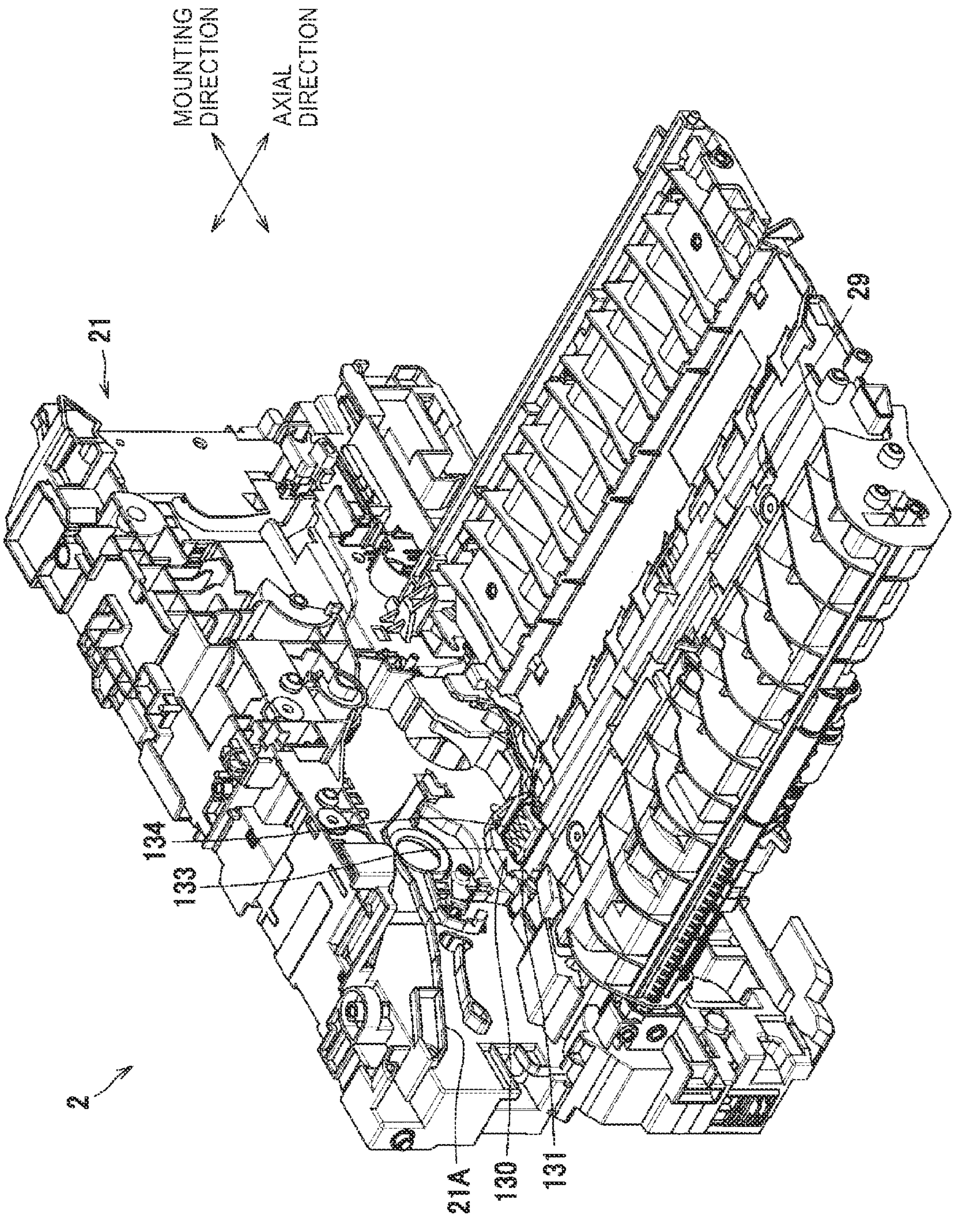
FIG. 7 is a perspective view depicting arrangement of an electric contact member in the image forming apparatus.

As shown in FIG. 7, an electric contact member 130 is provided at the sidewall 21 of one end-side of the main body housing 2. Specifically, the electric contact member 130 is arranged below the guide groove 21A of the sidewall 21. The electric contact member 130 faces the first storage medium 110 and the second storage medium 120 when the process cartridge 6 is mounted to the main body housing 2.

Figure 8A:
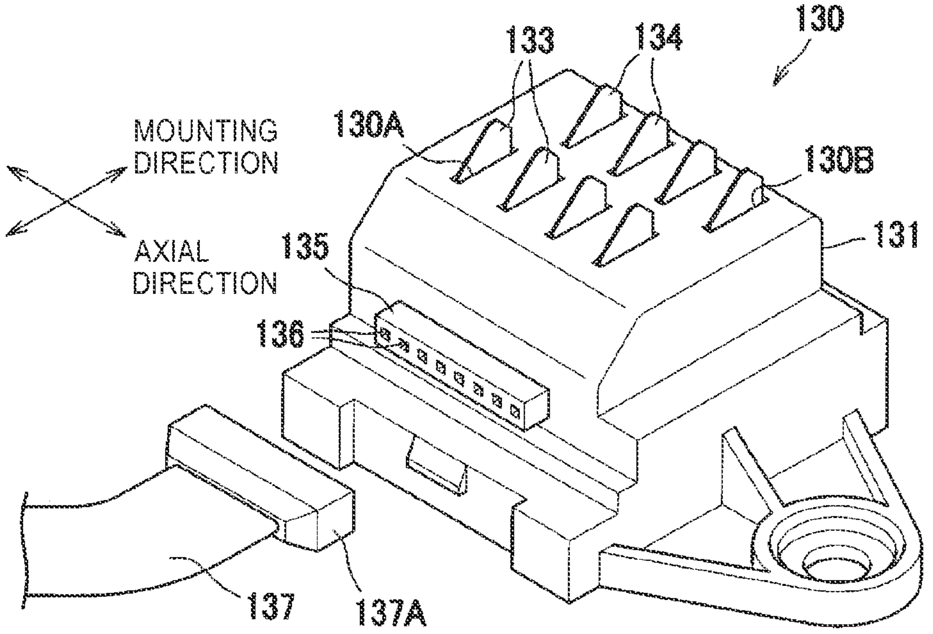
FIG. 8A is a perspective view of the electric contact member.

As shown in FIG. 8A, the electric contact member 130 includes a second housing 131, a third electric contact 133 and a fourth electric contact 134. The third electric contact 133 and the fourth electric contact 134 are supported by the second housing 131. In the illustrative embodiment, the third electric contact 133 includes a plurality of third electric contacts 133. The respective third electric contacts 133 corresponds to the respective first electric contacts 112. Also, the fourth electric contact includes a plurality of fourth electric contacts 134. The respective fourth electric contacts 134 corresponds to the respective second electric contacts 122.

The second housing 131 is a box-type single housing. The second housing 131 has holes 130A, 130B formed in an upper surface thereof. The holes 130A, 130B have a rectangular shape and extend in the mounting direction, respectively. The second housing 131 has a single connector 135 connected to the third electric contact 133 and the fourth electric contact 134.

The third electric contact 133 and the fourth electric contact 134 have a plate shape extending in the mounting direction, respectively. The third electric contact 133 and the fourth electric contact 134 are arranged perpendicularly to the axial direction.

Figure 8B:
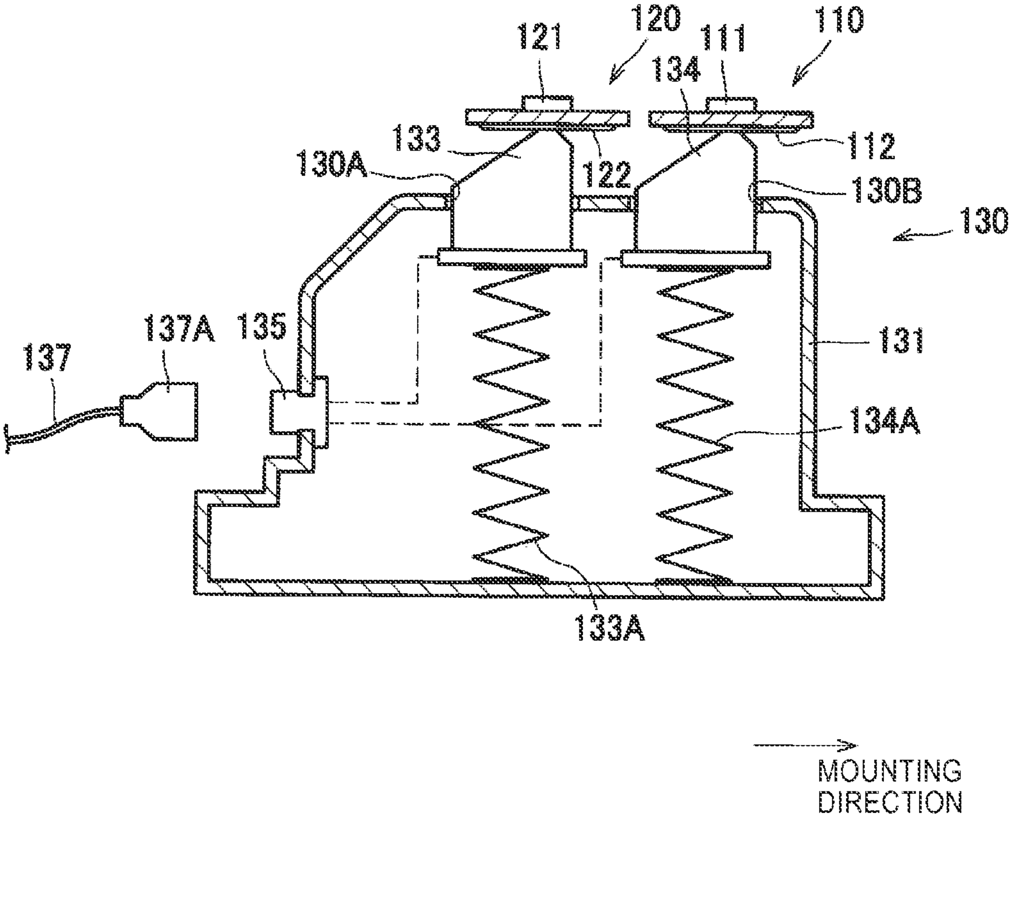
FIG. 8B is a sectional view of the electric contact member.

As shown in FIG. 8B, the third electric contact 133 and the fourth electric contact 134 partially protrude upward from the second housing 131 and are partially accommodated in the second housing 131. In the second housing 131, urging members 133A, 134A are provided, in correspondence to the third electric contact 133 and the fourth electric contact 134, respectively. The urging members 133A, 134A are configured to press the third electric contact 133 and the fourth electric contact 134, respectively, toward an outside, specifically an upper side of the second housing 131. The third electric contact 133 and the fourth electric contact 134 are configured to press the first electric contact 112 and the second electric contact 122, respectively, in the state where the process cartridge 6 is mounted to the image forming apparatus 1.

When the process cartridge 6 is mounted to the image forming apparatus 1, the third electric contact 133 is configured to come into electric contact with the first electric contact 112. Also, when the process cartridge 6 is mounted to the image forming apparatus 1, the fourth electric contact 134 is configured to come into electric contact with the second electric contact 122.

As shown in FIG. 6, each of the plurality of fourth electric contacts 134 is arranged at a position different from each of the plurality of third electric contacts 133 in a second intersection direction intersecting with the mounting direction. In the illustrative embodiment, the second intersection direction is the same as the first intersection direction. Specifically, in the axial direction, respective centers of the third electric contacts 133 coincides with respective centers C1 of the first electric contacts. Also, in the axial direction, respective centers of the fourth electric contact 134 coincides with respective centers C2 of the second electric contacts.

As shown in FIG. 8A, the connector 135 includes a plurality of fifth electric contacts 136. The plurality of fifth electric contacts 136 is electrically connected to the plurality of third electric contacts 133 and the plurality of fourth electric contacts 134, respectively. The connector 135 is connected to a plug 137A of a cable 137. The cable 137 includes a plurality of wirings provided therein.

The wirings electrically connected to the plurality of third electric contacts 133 and the plurality of fourth electric contacts 134 are taken out in one bundle as the cable 137 from the second housing 131. The information of the drum cartridge 8 and the information of the toner cartridge 9 read out from the third electric contacts 133 and the fourth electric contacts 134 are transmitted to the control device 100 through the cable 137.

Operations and effects of the image forming apparatus 1 and the process cartridge 6 configured as described above are described.

The process cartridge 6 includes the first storage medium 110 in which the product information of the toner cartridge 9 is stored and the second storage medium 120 in which the product information of the drum cartridge 8 is stored. For this reason, the image forming apparatus 1 can read out the product information of the toner cartridge 9 and the product information of the drum cartridge 8.

In the process cartridge 6, the first storage medium 110 and the second storage medium 120 are aligned in the mounting direction. For this reason, it is possible to arrange the third electric contacts 133 and the fourth electric contacts 134, which are members for reading out the information, so as to be aligned in the mounting direction. As a result, since a size of the electric contact member 130 can be reduced, it is possible to suppress the image forming apparatus 1 from being enlarged.

Also, in the electric contact member 130 of the illustrative embodiment, the third electric contact 133 and the fourth electric contact 134 are arranged at the single second housing 131. For this reason, the size of the electric contact member 130 can be reduced and it is possible to suppress the image forming apparatus 1 from being enlarged. Also, the electric contact member 130 includes the single connector 135. For this reason, it is possible to easily configure the wiring of the electric contact member 130.

Also, the first electric contacts 112 of the first storage medium 110 and the second electric contacts 122 of the second storage medium 120 are aligned in the axial direction, and each extends in the mounting direction. Thereby, when the process cartridge 6 is mounted, the first electric contacts 112 and the second electric contacts 122 can stably come into contact with the electric contact member 130 even though the first electric contacts 112 and the second electric contacts 122 is deviated in the mounting direction.

Also, the center position C1 of each of the first electric contacts 112 in the axial direction is different from the center position C2 of each of the second electric contacts 122 in the axial direction. For this reason, since the third electric contacts 133 can be arranged in the vicinity of the fourth electric contacts 134, it is possible to miniaturize the electric contact member 130.

Also, the second electric contacts 122 and the first electric contacts 112 are located at a same plane. For this reason, it is possible to easily arrange the third electric contacts 133 and the fourth electric contacts 134 and to stabilize the electrical contact.

Although the illustrative embodiment of the present disclosure has been described, the present disclosure is not limited to the illustrative embodiment. The specific configuration can be appropriately changed without departing from the spirit of the present disclosure.

Figure 9:
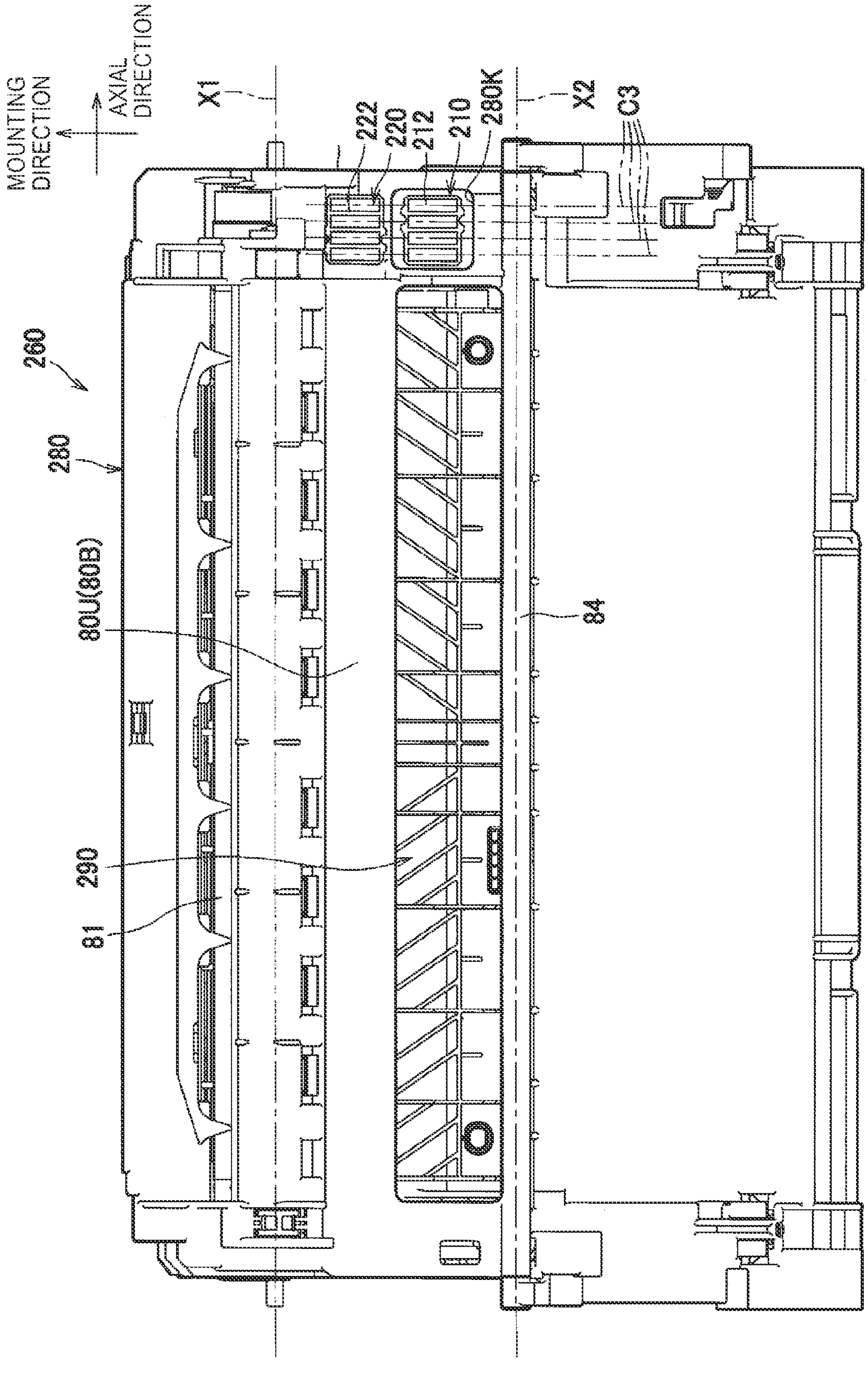
FIG. 9 depicts a process cartridge in accordance with another illustrative embodiment.

In the above illustrative embodiment, the center position C1 of each of the first electric contacts 112 in the axial direction is different from the center position C2 of each of the second electric contact 122 are different in the axial direction. However, the present disclosure is not limited thereto. For example, like a process cartridge 260 shown in FIG. 9, respective center positions of first electric contacts 212 and respective center positions of second electric contacts 222 may be located at the same positions C3 in the axial direction. Also in the process cartridge 260, in a state where a toner cartridge 290 is mounted to a drum cartridge 280, a first storage medium 210 is exposed via an opening 280K, and a second storage medium 120 is aligned with the first storage medium 210 in the mounting direction. Also in the process cartridge 260, the first storage medium 210 and the second storage medium 220 are aligned in the mounting direction, so that it is possible to suppress the image forming apparatus from being enlarged.

Figure 10:
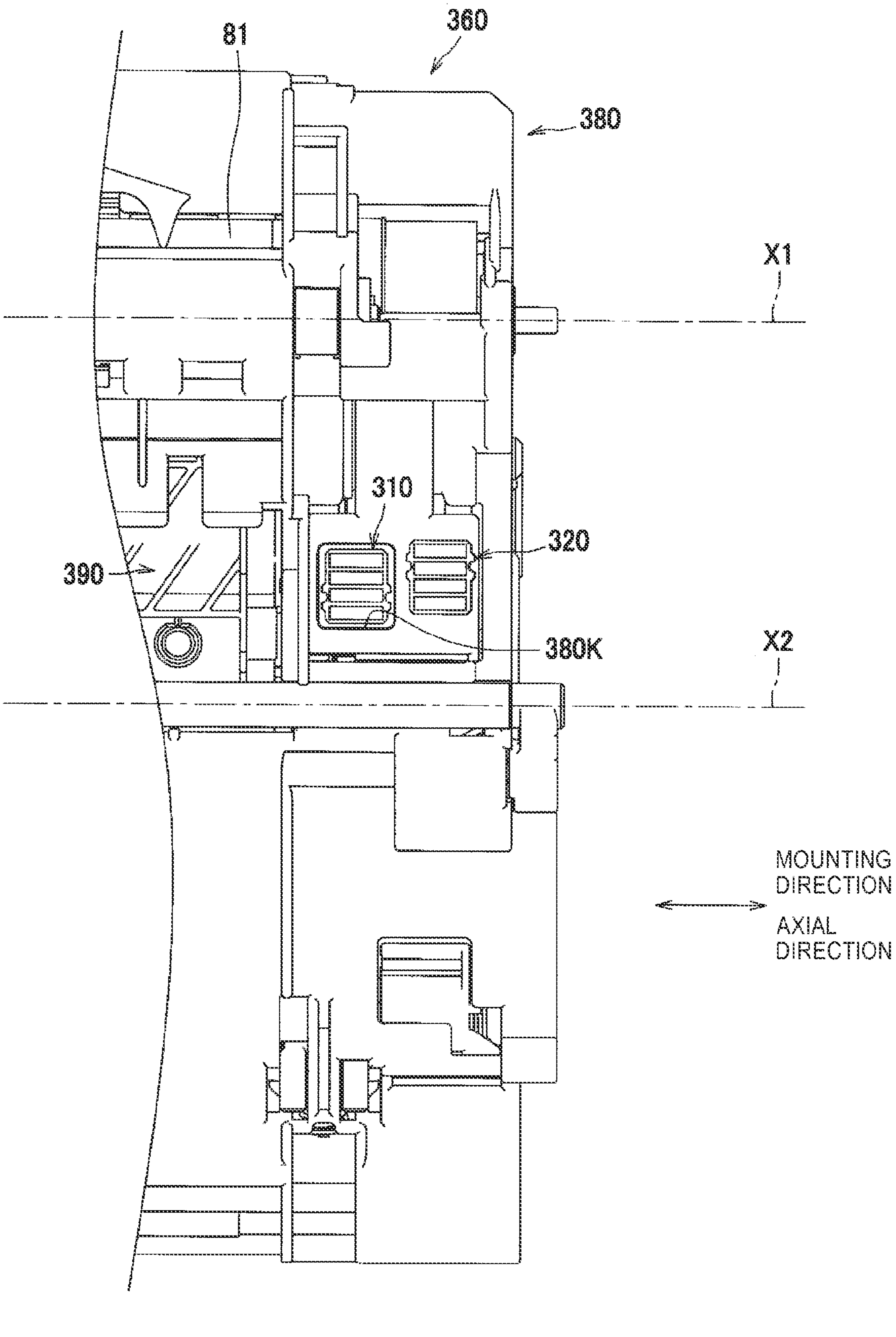
FIG. 10 depicts a process cartridge in accordance with another illustrative embodiment.

In the above illustrative embodiment, the axial direction in which the axis of the photosensitive drum extends is perpendicular to the mounting direction. However, the axial direction may not be perpendicular to the mounting direction. For example, in a process cartridge 360 shown in FIG. 10, the axial direction follows the mounting direction. That is, the process cartridge 360 is mounted to the image forming apparatus along the axial direction. In the process cartridge 360, in a state where a toner cartridge 390 is mounted to a drum cartridge 380, a first storage medium 310 is exposed via an opening 380K, and a second storage medium 320 is aligned with the first storage medium 310 in the mounting direction. Also in the process cartridge 360, a first storage medium 310 and a second storage medium 320 are aligned in the mounting direction, so that it is possible to suppress the image forming apparatus from being enlarged.

In the above illustrative embodiment, the first storage medium and the second storage medium are fixed by the adhesion. However, they may be fixed by other methods such as screwing and the like.

In the above illustrative embodiment, the electric contact member has the single housing but may include a plurality of housings. Also, the electric contact member may include a plurality of connectors. Also in these cases, it is easy to integrally arrange the plurality of housings, the plurality of connectors and the like. For this reason, it is possible to suppress the image forming apparatus from being enlarged.

The second intersection direction is the same as the first intersection direction but may be different.

In the illustrative embodiment, the image forming apparatus of the monochrome laser printer has been exemplified. However, the image forming apparatus may be a color image forming apparatus, an apparatus configured to perform the exposure by an LED, a copier or a complex machine.

The respective elements of the illustrative embodiment and modified embodiments can be implemented in any combination.

What is claimed is:

1. An image forming apparatus comprising:
- a main body;
- a toner cartridge comprising:
  - a housing configured to accommodate toner therein; and
  - a first storage medium including a first electric contact;
- a drum cartridge mountable to the main body, the drum cartridge comprising:
  - a frame;
  - a photosensitive drum; and
  - a second storage medium including a second electric contact; and
- a main body connector including:
  - a third electric contact configured to be in contact with the first electric contact in a state where the toner cartridge and the drum cartridge are mounted to the main body; and
  - a fourth electric contact configured to be in contact with the second electric contact in the state where the toner cartridge and the drum cartridge are mounted to the main body.

2. The image forming apparatus according to claim 1,
- wherein the photosensitive drum is rotatable about a first axis extending in an axial direction,
- wherein the main body comprises a first sidewall and a second sidewall spaced apart from each other in the axial direction,
- wherein in the state where the drum cartridge is mounted to the main body, the drum cartridge is located between the first sidewall and the second sidewall in the axial direction, and
- wherein the main body connector is located at the first sidewall.

3. The image forming apparatus according to claim 2,
- wherein the first sidewall has a guide groove configured to guide a process cartridge including the drum cartridge and the toner cartridge, and
- wherein the main body connector is located below the guide groove.

4. The image forming apparatus according to claim 1,
- wherein the photosensitive drum is rotatable about a first axis extending in an axial direction,
- wherein the drum cartridge is mountable to the main body in a mounting direction,
- wherein the first electric contact faces a vertical direction crossing the axial direction and the mounting direction, and
- wherein the second electric contact faces the vertical direction.

5. The image forming apparatus according to claim 4,
- wherein the vertical direction is perpendicular to the axial direction and the mounting direction.

6. The image forming apparatus according to claim 1,
- wherein the toner cartridge is mountable to the frame of the drum cartridge,
- wherein the frame has an opening, and
- wherein in a state where the toner cartridge is mounted to the frame and the drum cartridge is mounted to the main body, the third electric contact is configured to be in contact with the first electric contact through the opening.

7. The image forming apparatus according to claim 1, wherein the main body has a main body opening, and the main body comprises a front cover swingable between an opening position opening the main body opening and a closing position closing the main body opening, wherein in the state where the drum cartridge is mounted to the main body and in a state where the front cover is located at the closing position:

the third electric contact contacts to the first electric contact, and the fourth electric contact contacts to the second electric contact.

8. The image forming apparatus according to claim 7, wherein in the state where the front cover is located at the closing position:

the main body connector is located closer to the front cover than the photosensitive drum is to the front cover in the mounting direction.

9. The image forming apparatus according to claim 1, wherein the main body connector further includes:

a first urging member urging the third electric contact toward the first electric contact in the state where the toner cartridge and the drum cartridge are mounted to the main body, and a second urging member urging the fourth electric contact toward the second electric contact in the state where the toner cartridge and the drum cartridge are mounted to the main body.

10. The image forming apparatus according to claim 1, wherein the main body connector further includes a second housing, and wherein the third electric contact and the fourth electric contact are supported by the second housing.

11. The image forming apparatus according to claim 10, wherein the second housing is a box-type single housing.

12. The image forming apparatus according to claim 10, wherein the third electric contact is located outside of the second housing, and wherein the urging member is located inside the second housing.

13. The image forming apparatus according to claim 1, wherein the first storage medium stores information about the toner cartridge, and wherein the second storage medium stores information about the drum cartridge.

14. The image forming apparatus according to claim 13, wherein the main body connector further includes a single connector connected to the third electric contact and the fourth electric contact.

15. The image forming apparatus according to claim 14, further comprising:

a control device; and a cable including a plurality of wirings, the cable being connectable to the connector, wherein the control device reads out the information about the toner cartridge from the third electric contact through the cable, and wherein the control device reads out the information about the drum cartridge from the fourth electric contact through the cable.

16. The image forming apparatus according to claim 1, wherein the first storage medium includes a plurality of the first electric contacts, and wherein the second storage medium includes a plurality of the second electric contacts.

17. The image forming apparatus according to claim 16, wherein the plurality of the first electric contacts align in the axial direction.

18. The image forming apparatus according to claim 16, wherein the plurality of the second electric contacts align in the axial direction.

* * * * *